July 1, 1969  E. W. DAVIES  3,452,932
WIPER ASSEMBLIES
Filed May 5, 1967
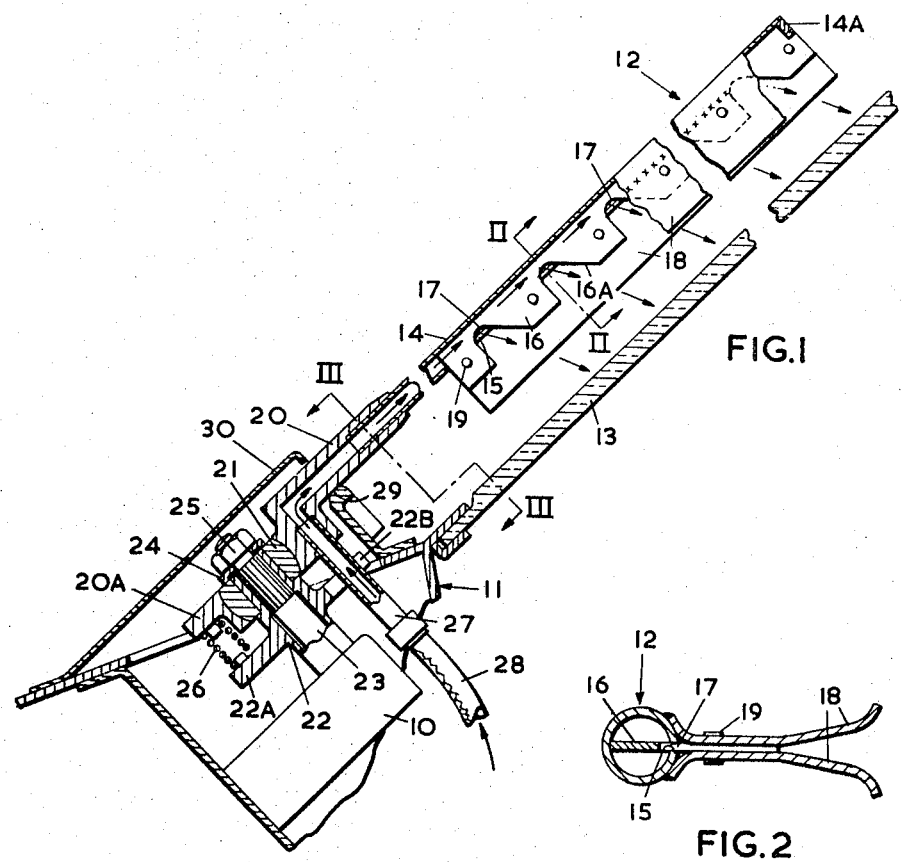
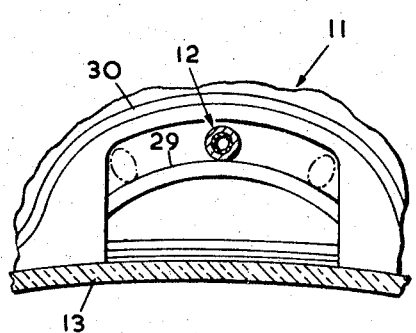
INVENTOR
Edward William Davies
BY
Misegades & Douglas
ATTORNEYS

United States Patent Office 3,452,932
Patented July 1, 1969

3,452,932
WIPER ASSEMBLIES
Edward William Davies, Luton, England, assignor to The English Electric Company, Limited, London, England, a British company
Filed May 5, 1967, Ser. No. 636,397
Claims priority, application Great Britain, May 6, 1966, 20,278/66
Int. Cl. B05b *1/10;* B60s *1/04*
U.S. Cl. 239—284                            8 Claims

ABSTRACT OF THE DISCLOSURE

A windscreen wiper includes a blade comprising a tube having a longitudinal slot in the side facing the windscreen. Air from an inlet pipe is blown on to the windscreen through this slot as the blade is oscillated by the motor. A comb plate and outlet guide may be provided to distribute the air more evenly over the windscreen.

For curved windscreens a fixed cam may be provided, the shape of the cam being curved so as to keep the blade (which is held against the cam by a spring) a constant distance from the windscreen. The blade never touches the windscreen.

---

This invention relates to screen wiper assemblies and is an improvement in or modification of the invention the subject of British Patent No. 1,051,880.

British Patent 1,051,880 discloses a screen wiper assembly including an elongated blade having outlet means for a gaseous fluid arranged in a side thereof, means for supplying said gaseous fluid to said outlet means, and driving means to which one end of said blade is pivotally connected so as to oscillate the blade, about a fixed pivot axis, across a screen in spaced relationship therewith whereby said fluid can sweep the screen. Such a screen wiper assembly will be referred to herein as an assembly of the kind specified.

The blade consists of a hollow tube-like member, closed at the outer end and having (for example) a number of holes or jets, or a longitudinal slot, in the side nearest the screen. Air or gas under pressure is introduced to the inside of the blade through the hollow interior of the pivot rod by which the blade is oscillated. An additive such as a detergent or defrosting agent may be injected into the stream of air or gas at a suitable point before it enters the blade, and the air or gas may be heated.

The spaced relationship between blade and screen is maintained by support means on the blade, one example given being a wheel on the outer end of the blade, rolling on the glass of the screen.

Such an arrangement has been found quite satisfactory on flat glass windscreens, but is not suitable if the windscreen is of a material (for example a synthetic resin or other plastics material) likely to be scratched or otherwise damaged by contact with the support means on the blade. One object of the present invention is therefore to allow such materials to be used for the screen.

According to one aspect of the invention, therefore, in an assembly of the kind specified, a fixed cam track is arranged adjacent said end of the blade, the blade being maintained in engagement with the cam track so as to follow it whereby the blade is maintained by the cam track in said spaced relationship with the screen.

Again, if the windscreen is not flat—and in many aircraft, for example, the windscreens are in fact sharply curved—the spacing between wiper and screen will vary as the wiper moves. Another object of this invention is therefore to provide a means of maintaining a constant or substantially constant spacing between the wiper and the screen.

A preferred feature of the invention accordingly provides that said cam track has a profile in the direction of movement of the blade, similar to that of the screen, so that as the blade is oscillated by the driving means it remains at all times spaced by substantially the same distance from the screen.

Blades of the kinds disclosed in British Patent 1,051,880 are found to be quite satisfactory for many purposes, but in some applications (particularly high-speed aircraft) it is desirable to control more accurately the path and the shape of the air or gas jets from the outlet means on the blade, and/or to increase its velocity. Accordingly, a further object of this invention is to achieve this control and/or velocity increase.

According to another aspect of the invention, therefore, in an assembly of the kind specified said blade includes a tube extending generally parallel to the screen and arranged to be supplied with said fluid through the end thereof nearest said pivot axis, said tube having a continuous longitudinal slot in the side thereof facing the screen and a flat comb plate, the thickness of which is substantially the same as the width of said slot, extending transversely across the inside of said tube over the length of said slot, projecting through the slot and having a plurality of notches extending across the comb plate from the edge of the comb plate nearest the screen to within the tube so that said fluid can escape from the tube through said notches.

According to another preferred feature of the invention, such an assembly includes divergent fluid exit guide means projecting beyond the comb plate towards the screen.

Preferably, said exit guide means comprises a pair of plates having parallel portions fixed to either side of said comb plate, convergent portions at the ends thereof nearest the tube and divergent portions between the comb plate and the screen.

A screen wiper assembly in a preferred form according to the invention will now be described by way of example and with reference to the accompanying drawings, of which:

FIG. 1 is a part-sectional side elevation showing the windscreen wiper assembly with the wiper in a central position;

FIG. 2 is a sectional view on the line II—II of FIG. 1;

FIG. 3 is a sectional plan view on the line III—III of FIG. 1; and

FIG. 4 shows one component in an alternative form from that in which it is shown in FIG. 1.

With reference firstly to FIGS. 1 to 3, a windscreen wiper assembly includes an electric motor-driven oscillating drive unit 10 fixed with respect to the structure 11 of a vehicle of which it forms part, and a wiper blade 12 movable in an oscillatory manner by the drive unit 10 across a curved windscreen 13 of the vehicle.

The blade 12 comprises a cylindrical tube 14, closed at its outer end 14A and extending roughly parallel to the windscreen. A slot 15 is formed longitudinally in the tube 14 on the side thereof nearest the windscreen, and a transverse comb plate 16 is fixed in the slot 15, in such a way that the interior of the tube can only communicate with the atmosphere through a number of openings 17, which occur where a number of cut-out portions 16A of the comb plate extend into the tube 14. A pair of convergent-divergent nozzle plates 18 are fixed longitudinally to the tube 14, the comb plate 16 being sandwiched between the nozzle plates 18 and fixed thereto by suitable means 19 such as riveting or spot-welding.

The inner end of the tube 14 is fixed to a hollow extension piece 20, which is mounted, by means of a spherical bearing member 21, on a driving member 22. The latter is splined to a drive shaft 23 driven by the drive unit 10, and the spherical bearing member 21 is anchored in place by means of a washer 24 and nut 25 on an extension of the drive shaft 23.

The extension piece 20 carries, at the end remote from the blade 12, a shoulder 20A; and a corresponding shoulder 22A is formed on the driving member 22. A compression spring 26 is arranged between the shoulders 20A and 22A so as to tend to urge the blade 12 towards the windscreen 13.

The hollow interior of the extension piece 20 communicates with an inlet pipe 27, to which there is fitted a flexible hose 28.

The driving member 22 has a fork piece 22B engaging the inlet pipe 27 so as to drive the blade 12.

A curved cam track 29 is fixed below the windscreen 13, the extension piece 20 being urged into continuous engagement with the cam track 29 by the spring 26. The cam track 29 is so arranged that it maintains the blade 12 out of contact with the windscreen 13 at all times.

A protective shroud 30 may be fitted over the working parts of the assembly.

In operation, compressed air is continuously fed to the interior of the blade 12 through the flexible pipe 28, while the drive unit 10 oscillates the blade across the windscreen 13 between the two extreme positions shown by chain-dotted lines in FIG. 3, the blade being guided by the cam track 29 in a curved path closely following the curve of the windscreen. The air escapes through the openings 17 in the blade and passes thence through the convergent-divergent nozzle defined by the nozzle plates 18 and so onto the windscreen, which is thus kept continuously clear of rain.

Various modifications are possible to the assembly described above within the scope of the invention: a few such modifications will now be mentioned by way of example.

The comb plate, if provided, can be of any suitable design: in FIG. 1 each cut-out portion 16A has a radial side nearest the inner end of the blade, its other side being inclined at an angle to the axis of tube 14. FIG. 4 shows an alternative version, in which both sides of each cut-out portion are at an angle to the said axis.

The nozzle mentioned above need not be convergent-divergent in form: it may be divergent only or convergent only.

A suitable cam follower, such as a wheel or roller, may be fitted on the blade, e.g. on the tube 14 or extension 20, to engage the cam track 29.

The drive unit 10 may be driven for example by air instead of electrically.

The assembly may incorporate, in the blade 12 or separately, suitable means for applying a rain-repellent compound to the windscreen. Such rain-repellent compounds are well-known; they cause the rain drops to become more nearly spherical and therefore more easily removable.

This compound would be supplied from a suitable pressurised source, and preferably through the blade, with or without simultaneous application of compressed air. If it is desired to apply it without air, a suitable change-over valve (for example) may be provided for automatically shutting off the compressed air supply to the blade while the drive unit 10 is operating and while the rain-repellent compound is being applied.

Suitable means for applying a rain-repellent compound might include (for example) a hypodermic needle extending through the tube 14, or a spray mist device on the blade.

The windscreen need not be curved.

It will be understood that if for example the windscreen is curved in a direction parallel to the blade, the blade itself may then be curved accordingly.

I claim:

1. In a screen wiper assembly including an elongated blade having in a side thereof outlet means for a gaseous fluid, means for supplying said gaseous fluid to said outlet means, and driving means to which one end of said blade is pivotally connected so as to oscillate the blade, about a fixed pivot axis, across a screen in spaced relationship therewith whereby said fluid can sweep said screen; a fixed cam track adjacent said one end of the blade and means for maintaining the blade in engagement with said cam track during oscillation of the blade whereby to maintain said spaced relationship between the blade and the screen.

2. An assembly according to claim 1, wherein said cam track has a profile in the direction of said oscillation of the blade similar to that of the screen, so that as the blade is oscillated by the driving means it remains at all times spaced by substantially a uniform distance from the screen.

3. An assembly according to claim 2, wherein said screen and cam track are curved in the direction of movement of the blade.

4. An assembly according to claim 3, wherein the blade is pivotally connected through a spherical bearing with a driving member arranged for oscillating movement about said fixed pivot axis and being part of said driving means.

5. An assembly according to claim 1 including resilient means transversely engaging said one end of the blade whereby to urge said end outwardly away from the screen, said fixed pivot axis being intermediate between said resilient means and cam track and the cam track being disposed on the same side of the blade as is the screen, whereby the resilient means urges the blade into continuous engagement with the cam track.

6. In a screen wiper assembly including an elongated blade having in a side thereof outlet means for a gaseous fluid, means for supplying said gaseous fluid to said outlet means, and driving means to which one end of said blade is pivotally connected so as to oscillate the blade, about a fixed pivot axis, across a screen in spaced relationship therewith whereby said fluid can sweep said screen; a tube in said blade, extending generally parallel to the screen away from said pivot axis and arranged to be supplied with said gaseous fluid through the end of said tube nearest the pivot axis, said tube having a continuous longitudinal slot in one side thereof facing said screen, and a flat comb plate, the thickness of which is substantially the same as the width of said slot, extending transversely across the inside of said tube over the length of said slot, projecting through the slot and having a plurality of notches extending across the comb plate from the edge of the comb plate nearest the screen to within the tube so that said fluid can escape from the tube through said notches.

7. An assembly according to claim 6, wherein said blade includes divergent fluid exit guide means projecting beyond the comb plate towards the screen.

8. An assembly according to claim 7, wherein said exit guide means comprises a pair of plates having parallel portions fixed to either side of said comb plate, convergent portions at the ends thereof nearest the tube and divergent portions between the comb plate and the screen.

References Cited

UNITED STATES PATENTS 3,008,170  11/1961  Marks _____ 239—284 X

FOREIGN PATENTS 1,051,880  12/1966  Great Britain.

EVERETT W. KIRBY, Primary Examiner.

U.S. Cl. X.R.

15—250.01, 250.04